United States Patent [19]

Clossey

[11] Patent Number: 4,978,302

[45] Date of Patent: Dec. 18, 1990

[54] COMPUTER PROGRAM FOR TEACHING LAND MASS RECOGNITION

[76] Inventor: Mary Clossey, 433 Oakdene Ave., Cliffside Park, N.J. 07010

[21] Appl. No.: 438,792

[22] Filed: Nov. 20, 1989

[51] Int. Cl.[5] .......................... G09B 29/10; G09B 7/00
[52] U.S. Cl. ..................................... 434/153; 434/335
[58] Field of Search ................ 434/153, 335, 322, 323

[56] References Cited

U.S. PATENT DOCUMENTS

| | | | |
|---|---|---|---|
| 4,474,557 | 10/1984 | Clossey | 434/335 |
| 4,609,359 | 9/1986 | Erickson et al. | 434/153 |
| 4,673,197 | 6/1987 | Shtipelman et al. | 434/153 |
| 4,725,236 | 2/1988 | Neri Vela et al. | 434/153 |

Primary Examiner—Richard J. Apley
Assistant Examiner—Glenn E. Richman
Attorney, Agent, or Firm—Iman Abdallah

[57] ABSTRACT

A computer program to serve as a teaching aid in the recognition of the shape of land masses is disclosed. The program generates visual displays of a boundary map of the United States, a boundary map of an individual state and a list of names of states which includes the correct name for the displayed individual state. The user selects a name for the displayed individual state and the computer program audibly indicates whether the selection was correct.

3 Claims, 2 Drawing Sheets

COMPUTER PROGRAM FOR TEACHING LAND MASS RECOGNITION

BACKGROUND OF THE INVENTION

The present invention generally relates to computer programs useful as teaching aids. More specifically, the present invention relates to computer programs to facilitate recognition of land masses by their shape.

In U.S. Patent No. 4,474,557 to the present Applicant an electronic world map game is disclosed as a teaching aid for recognition of the land masses of the world. The widespread use of computer-assisted learning in schools and the home has developed a need for the teaching land mass shape recognition to be made adaptable to general purpose computers.

SUMMARY OF THE INVENTION

The present invention provides a method of operating a general purpose computer as a teaching strategy for recognition of the shape and location of land masses. In a preferred embodiment computer programming steps are described for generating a display of a boundary map of the United States on a computer screen in conjunction with a display of a boundary map of an individual state and a list of state names which include the correct name for the displayed individual state. The learning objective is accomplished by a user selectively indicating a choice from the list of state names to identify the individually displayed state. When the correct choice is made an audible indication is made to the user by operation of the computer program and a different individual state and list of names is randomly generated and displayed. The selective pairing of state name and displayed individual state is then repeated by the user.

DESCRIPTION OF A PREFERRED EMBODIMENT

Figure 1:
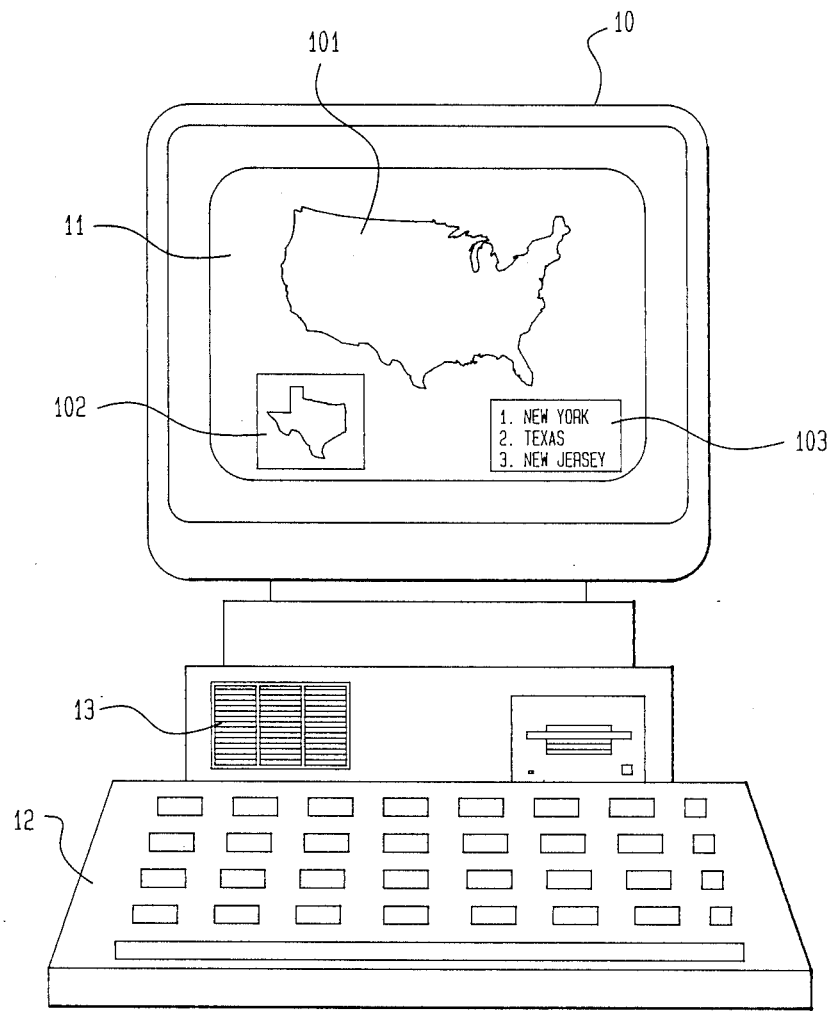
FIG. 1 is a perspective view of a programmable general purpose computer that has been programmed in accordance with the teachings of the present invention.

FIG. 1 illustrates in a perspective view a general purpose computer useful for operation of the computer program of the present invention. The general purpose computer 10 suitable for operation of the presently disclosed computer program includes a display screen 11, a keyboard 12, audible sound generation means 13 and means to simultaneously generate a full screen graphic display 101, a first window graphic display 102 and a second window graphic display 103. The general purpose computer 10 also includes readable memory.

Figure 2:
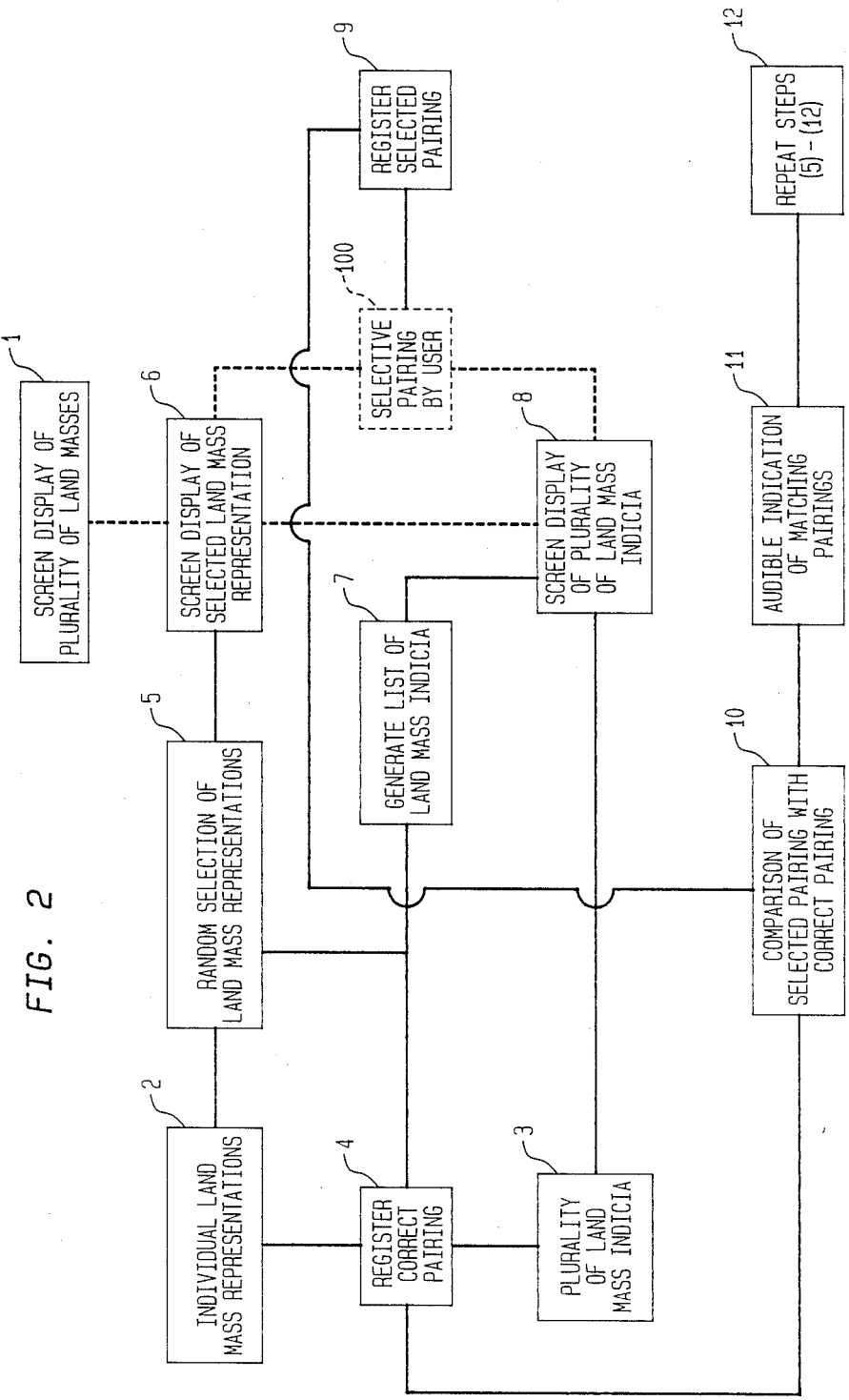
FIG. 2 is a block diagram of the computer program of the present invention.

In FIG. 2 a block diagram is shown to describe the programming steps for the present invention. The preferred embodiment is described for the recognition of the shape of the individual states of the United States, but the computer program of the present invention may be adapted to serve as a teaching aid for the recognition of the shape of individual countries of the various continents of the world or like subunits of a mass configuration.

Step 1 comprises generating a full screen graphic display 1 of a boundary map of the United States 101 on the computer screen 11 of the general purpose computer 10. Step 2 comprises generating a plurality of boundary maps of the individual states of the United States 2 within the computer 10. This plurality of individual state representations 2 are stored within a first memory location within the computer 10. Step 3 comprises generating a plurality of indicia for the individual states 3, for example "31-Texas" in the computer 10 which are stored within a second memory location within the computer 10. Step 4 comprises registering the correct pairing 4 of the individual state representations 2 and the plurality of indicia for the individual states 3, this registering being stored in a third memory location within the computer 10. Step 5 comprises randomly selecting 5 one of said individual state representations 2. Any of the methods of randomly selective one representation from a plurality of representations as known in the prior art may be utilized for this step. Step 6 comprises generating a graphic display of a boundary map 6 of the selected individual state representation 2 within said first window 102 on the computer screen 11 contemporaneously with the graphic display of the boundary map of the United States 101. Step 7 comprises generating a list of indicia 7 which includes the correct indicia for the displayed individual state representation 2. This step can be accomplished by reading the third memory location to determine the correct indicia for the displayed state and randomly generating the other indicia to comprise the list 7 by means generally known in the art. Step 8 comprises generating a graphic display 8 of the generated list 7 within said second window 103 on the computer screen 11 contemporaneously with the graphic display of the boundary map of the United States 101 and the graphic display of the individual state within said first window 102.

Upon completion of the Steps 1–8 as heretofore described the user will have on the computer screen 11 a visual display of the boundary map of the United States 101, a visual display of a boundary map of an individual state within said first window 102 and a visual display of a list of state names including the correct state name for the individual state displayed in said first window 102 within said second window 103. A choice for the name of the individually displayed state 102 is indicated by pressing a key of the keyboard 12, indicated in FIG. 2 by the block numbered 100 shown in phantom lines. Step 9 of the computer program of the present invention comprises registering the choice made by the user 9. Step 10 comprises comparing 10 the registered correct pairing 4 with the registered selected pairing 9. Step 11 comprises audibly indicating when the registered correct pairing 4 and the registered selected pairing 9 match. Steps 5–11 are then repeated (Step 12).

Various changes, modifications and additions may be made to the computer program of the present invention without departing from the spirit and scope of the present disclosure. For example, the individual states may be pictorially represented on the computer screen 11 by generally recognized objects and figures. Furthermore, the computer program may include a step for visually indicating on the boundary map of the United States 101 the location of the individual state when correctly identified. Such modifications are intended to be included within the present invention as claimed below.

Therefore in view of the foregoing, I claim:

1. A computer process implemented by a computer program to facilitate recognition of land masses by their shape for the purpose of serving as a teaching aid, said process comprising steps for:

(1) generating a visual display on a computer screen of a plurality of land masses in their natural configuration;

(2) generating representations for each of said plurality of land masses;

(3) storing the generated representations in a first memory location;

(4) generating a plurality of indicia for each of said plurality of land masses;

(5) storing the generated indicia in a second memory location;

(6) registering the correct pairing of said indicia and said representations of land masses;

(7) storing the registered correct pairing in a third memory location;

(8) randomly selecting one of said representations for a land mass;

(9) generating within a first window on a computer screen a visual display of said randomly selected one of said plurality of representations for land masses, contemporaneously with the visual display of said plurality of land masses in their natural configuration;

(10) generating a list of indicia for the displayed one of said plurality of representations;

(11) generating within a second window on a computer screen a visual display of said plurality of indicia for each of said plurality of land masses, contemporaneously with the visual display of said plurality of land masses and the visual display within said first window on a computer screen of one of said plurality of land masses;

(12) registering selected pairing by the user of said one of said plurality of land masses and one of said plurality of indicia for said plurality of land masses;

(13) comparing the registered selected pairing with the registered correct pairing of said one of said plurality of land masses and one of said plurality of indicia for said plurality of land masses;

(14) audibly indicating the matching of the selected pairing and the correct pairing;

(15) repeating steps (8)–(15).

2. A computer process as described in claim 1 wherein Step 9 comprises generating a visual display of a generally recognizable figure or object formed in the shape of an individual land mass.

3. A computer process as described in Claim 1 including a step comprising generating a visual indication of the location of the individual land mass on the visual display of the plurality of land masses in their natural configuration when the correct pairing of individual land mass and land mass indicia is made.

* * * * *